US005457312A

United States Patent [19]

Mansour

[11] Patent Number: 5,457,312

[45] Date of Patent: Oct. 10, 1995

[54] METHOD AND APPARATUS FOR COUNTING FLAT SHEETS OF SPECULARLY REFLECTIVE MATERIAL

[75] Inventor: Tahir M. Mansour, Livonia, Mich.

[73] Assignee: Ford Motor Company, Dearborn, Mich.

[21] Appl. No.: 295,197

[22] Filed: Aug. 24, 1994

[51] Int. Cl.$^6$ .............................. G01N 21/86; G01M 9/00

[52] U.S. Cl. .............................. 250/222.2; 377/8; 377/53

[58] Field of Search .............................. 250/222.2; 377/8, 377/53

[56] References Cited

U.S. PATENT DOCUMENTS

| | | |
|---|---|---|
| 3,414,732 | 12/1968 | Stegenga . |
| 3,422,274 | 1/1969 | Coan . |
| 3,581,067 | 5/1971 | Willits et al. . |
| 3,790,759 | 2/1974 | Mohan et al. . |
| 3,813,523 | 5/1974 | Mohan et al. . |
| 3,835,306 | 9/1974 | Bills et al. . |
| 4,217,491 | 8/1980 | Dufford, Jr. et al. . |
| 4,296,314 | 10/1981 | Dabisch et al. . |
| 4,298,790 | 11/1981 | Decker et al. . |
| 4,373,135 | 2/1983 | Mohan et al. . |
| 4,481,667 | 11/1984 | Price et al. . |
| 4,771,443 | 9/1988 | Mohan et al. . |
| 4,807,263 | 2/1989 | Ohno et al. . |
| 5,040,196 | 8/1991 | Woodward . |
| 5,202,554 | 4/1993 | Wilton et al. . |
| 5,221,837 | 6/1993 | Walgren et al. . |
| 5,296,895 | 3/1994 | Naito . |

FOREIGN PATENT DOCUMENTS

| | | |
|---|---|---|
| 3544590 | 6/1987 | Germany . |
| 3223985 | of 1991 | Japan . |
| 4133445 | 5/1992 | Japan . |
| WO9110972 | 7/1991 | WIPO . |

*Primary Examiner*—Edward P. Westin
*Assistant Examiner*—Jacqueline M. Steady
*Attorney, Agent, or Firm*—Lorraine S. Melotik; Roger L. May

[57] ABSTRACT

A method and apparatus for counting flat sheets of specularly reflective material juxtaposed in side by side relationship including a source of a parallel, collimated, beam of light adapted for movement to shine on a finite point across sides of a plurality of flat sheets at a shallow, acute angle of incidence relative to the sides of the flat sheets such that the beam of light is specularly reflected from the sides of the flat sheets except at one terminal edge of each side of the flat sheets where the beam of light is diffusely reflected, a sensor for sensing light diffusely reflected from the terminal edge of each of the flat sheets and generating an output signal in response to the intensity of the diffusely reflected light, and a microprocessor receiving the output signal from the sensor and generating a numerical count of the flat sheets over which the beam of light has been moved.

17 Claims, 3 Drawing Sheets

FIG 1
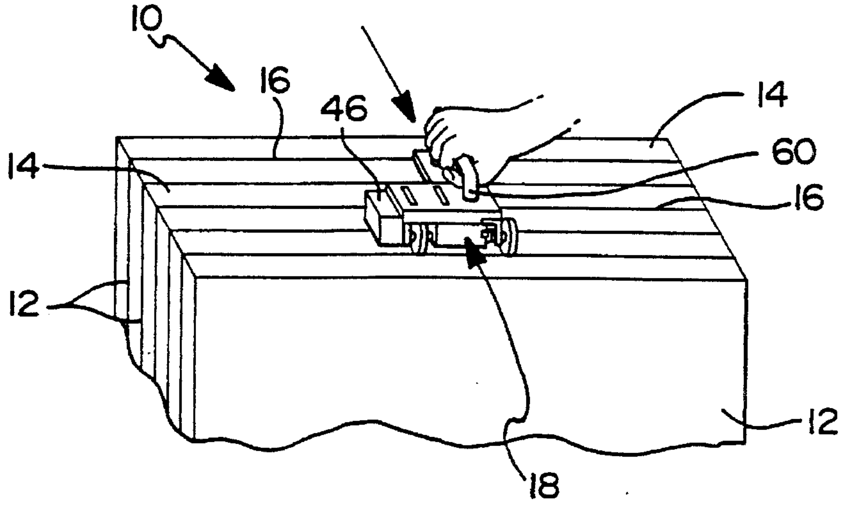
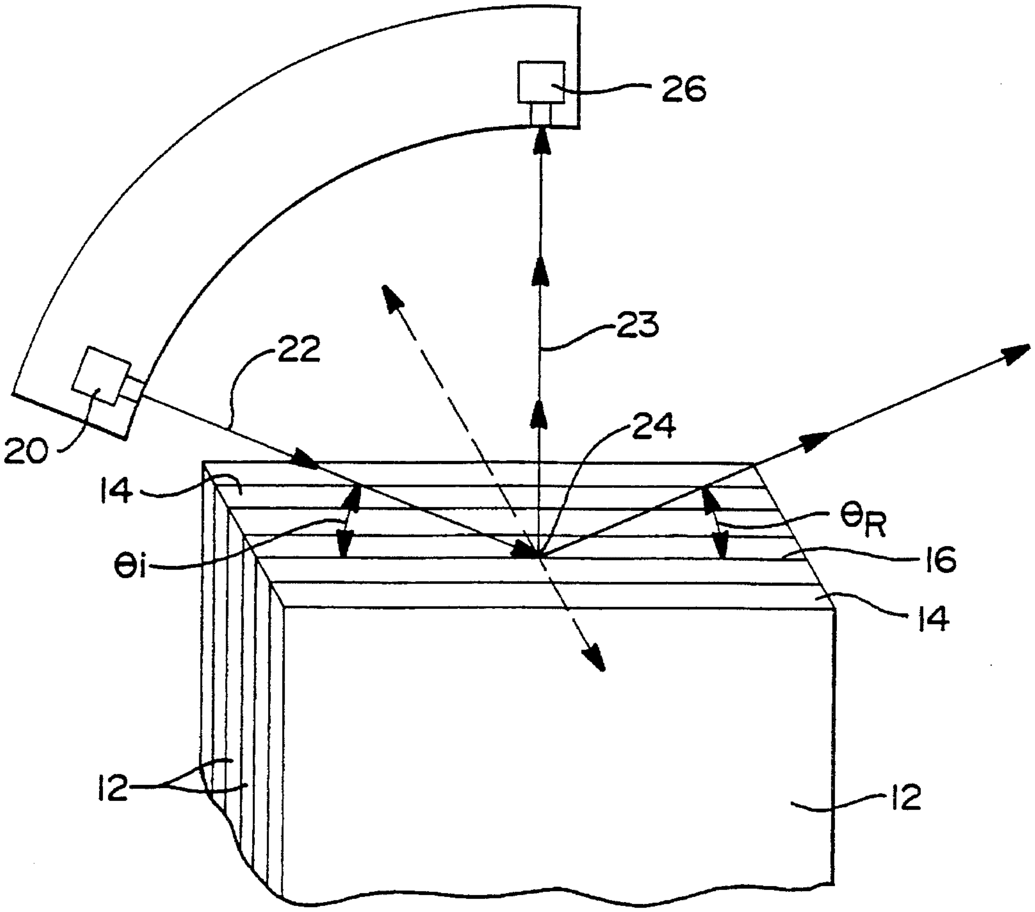
FIG 2

FIG 3
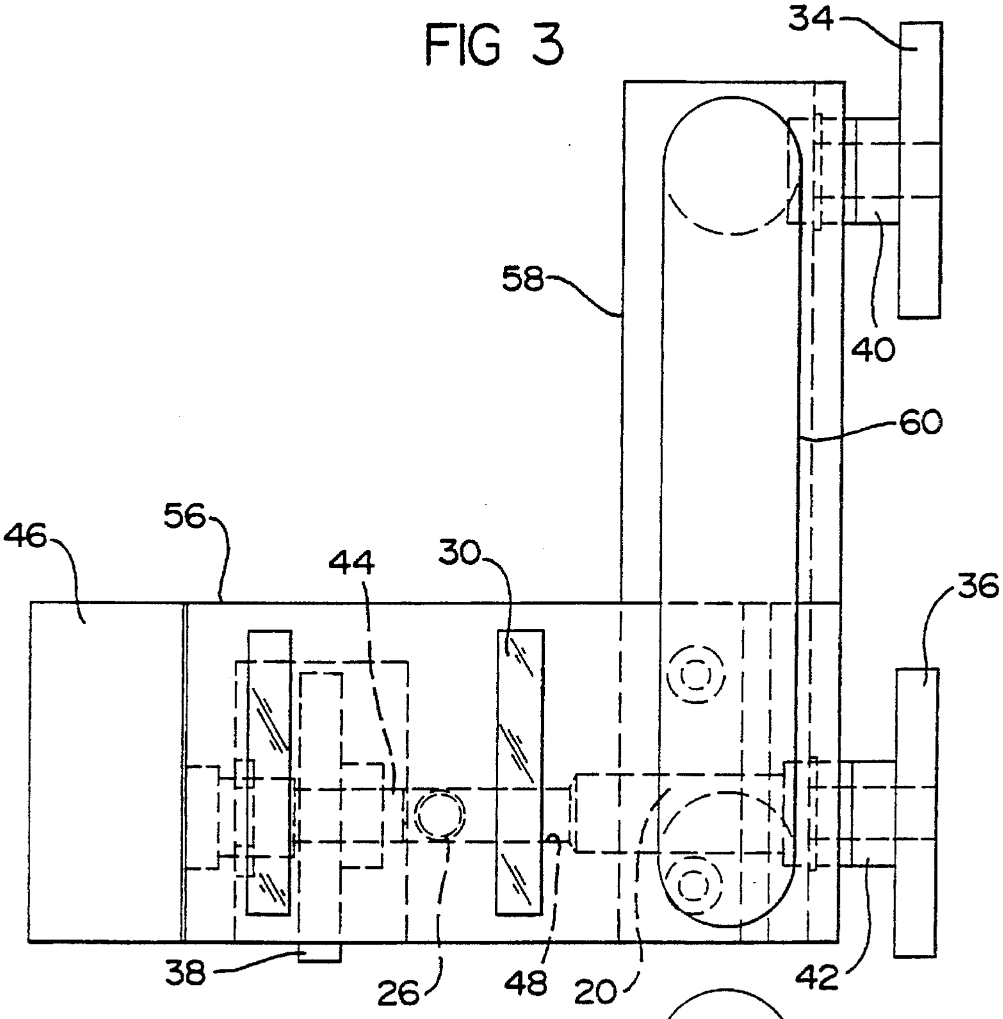
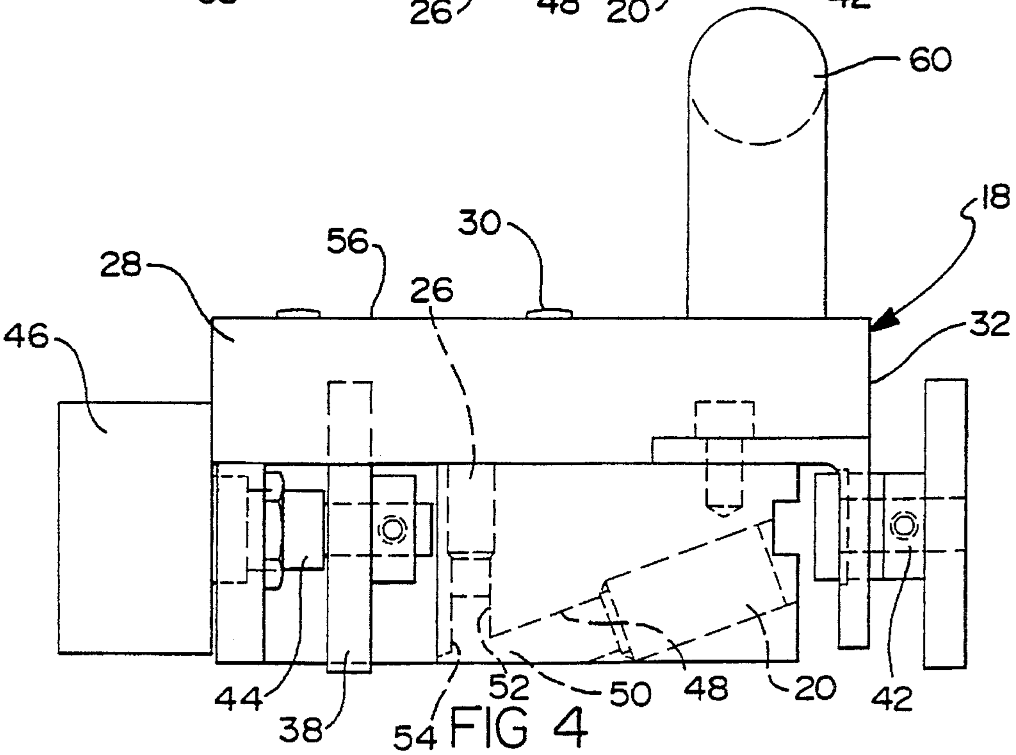
FIG 4

FIG 5
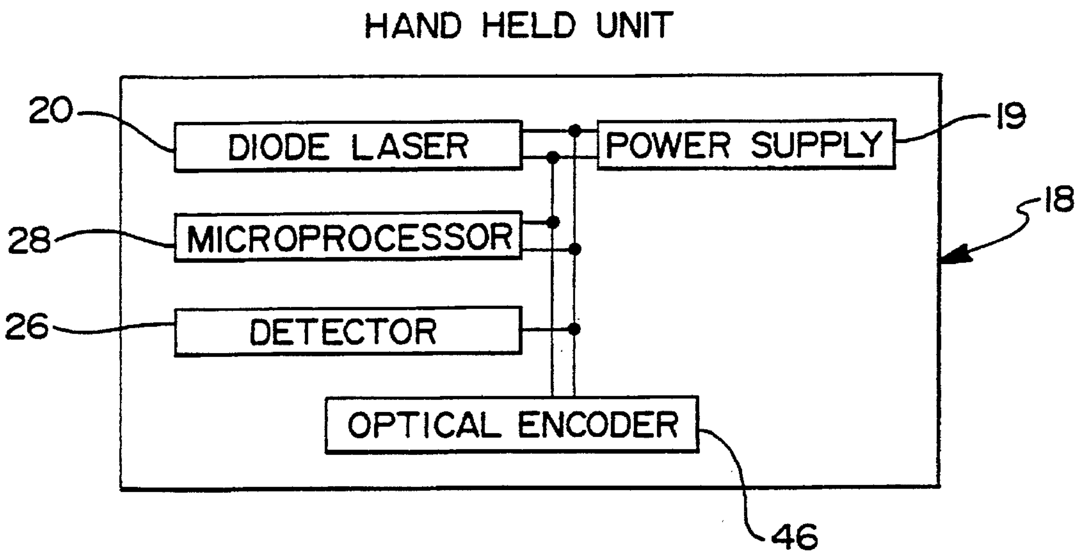
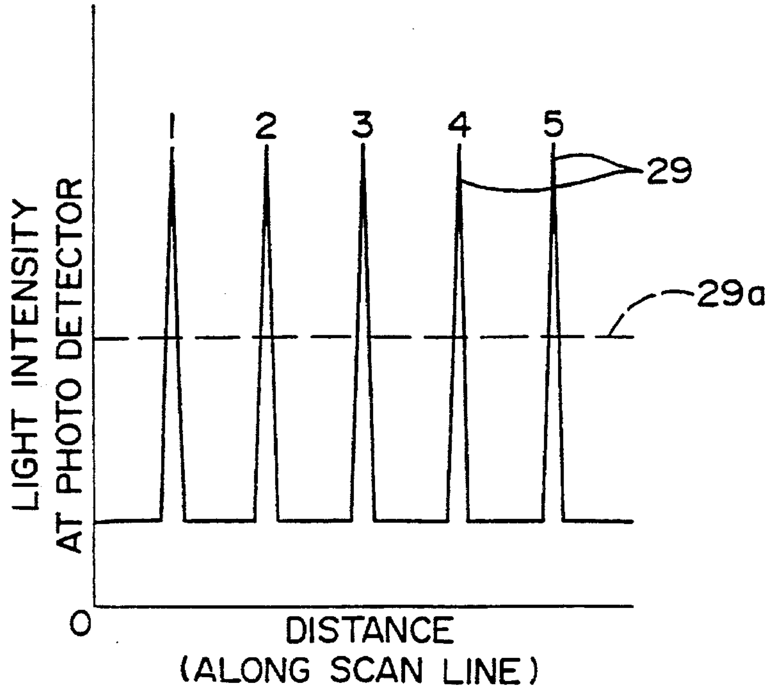
FIG 6

METHOD AND APPARATUS FOR COUNTING FLAT SHEETS OF SPECULARLY REFLECTIVE MATERIAL

BACKGROUND OF THE INVENTION

1. Field Of the Invention

The present invention relates generally to a method and apparatus for counting flat sheets of specularly reflective material and, more specifically, to a method and apparatus for sensing and counting flat sheets of glass.

2. Description Of the Related Art

Specularly reflective material such as glass is manufactured for many commercial, residential and automotive applications. Glass is commonly manufactured in the form of a substantially flat or planar sheet. Planar sheets of glass are manufactured in many sizes having different thicknesses and characteristics to match the requirements of the intended application. Each planar sheet of glass is typically cut from a larger sheet of glass. When a smaller sheet of glass is cut from a larger sheet of glass, the larger sheet is scribed to form a line of cut and then essentially broken along the line of cut. A cut side of the planar sheet of glass is generally smooth except at an edge adjacent the line of cut which, relatively speaking, is rough. When collimated light is shined on the cut side of the planar sheet of glass, the light will be specularly reflected except at this rough edge where it is substantially diffusely reflected.

Once the planar sheet of glass is cut to size, similar sheets of glass having various thicknesses may be packaged such that they are tightly juxtaposed in side by side relationship with respect to one another, crated and shipped. Once the sheets of glass are crated, the quantity or number of sheets of glass in each crate must be determined. One way to determine this is to have the sheets of glass manually counted. Unfortunately, human error being what it is, the number of sheets of glass is often miscounted, causing returns of surplus sheets of glass and deficiencies in the number of sheets of glass.

One effort to overcome miscounting is disclosed in U.S. Pat. No. 4,298,790 issued to Decker et al. on Nov. 3, 1981 for a Method And Apparatus For Determining The Number Of Sheets In A Stack. This patented apparatus discloses a scanner including a sensor for sensing the edge of the outer most stacked sheets and the interface between adjacent sheets. The patented apparatus also discloses a source or emitter for directing infrared light toward the sides of the stacked sheets and a detector for sensing the density of the specularly reflected infrared energy rays. The reflected infrared energy rays are a maximum density when reflected from a plane generally parallel to the surface of the emitter and detector and the density decreases when the rays are incident on the edges of the outermost stacked sheets and on the interface between adjacent stacked sheets. The patented apparatus measures the density of the specularly reflected light and a sheet is counted when the light density drops below a predetermined value, as for example, when light is diffusely reflected at the edges of the sheet, in this case, glass.

Due to unwanted "noise" and specular reflection at the edge of a sheet of glass, the patented apparatus suffers from the disadvantage that it is often difficult to determine whether the light density has indeed decreased sufficiently for a count to be made. Inaccuracies in counts can often occur necessitating further attempts to scan the edges and perform manual counts for further accuracy.

SUMMARY OF THE INVENTION

Accordingly, a method and apparatus for counting flat sheets of specularly reflected material juxtaposed in side by side relationship. More specifically, the apparatus includes a source of a parallel, collimated, beam of light adapted for movement to shine on a finite point across sides of a plurality of flat sheets at a shallow, acute angle of incidence relative to the sides of the flat sheets. The beam of light will be specularly reflected from the sides of the flat sheets except at one terminal edge of each side of the flat sheets where the beam of light is diffusely reflected. The apparatus also includes a sensor for sensing light diffusely reflected from the terminal edge of each of the flat sheets and generating an output signal in response to the intensity of the diffusely reflected light. The apparatus further includes a microprocessor receiving the output signal from the sensor, and thresholding this output signal to generate a numerical count of the flat sheets over which the beam of light has been moved.

Additionally, the present invention is also directed toward a method of counting flat sheets of specularly reflecting material which are juxtaposed in side by side relation by taking advantage of the light diffusely reflected from a terminal portion of the sides of the specularly reflected material.

One feature of the present invention is that a method and apparatus is provided for counting flat sheets of specularly reflective material such as glass. Another feature of the present invention is that the method and apparatus do not rely on the intensity of the specularly reflected light from the material counted, but, rather is specifically adapted to measure only the light diffusely reflected from the sides of the glass. Yet another feature of the present invention is that the method and apparatus avoid unwanted noise and improves the accuracy of the count found in conventional devices.

Other features and advantages of the present invention will be readily appreciated as the same becomes better understood after reading the subsequent description when taken in connection with the accompanying drawings.

BRIEF DESCRIPTION OF THE DRAWINGS

FIG. 1 is a perspective view of an apparatus for counting flat sheets of specularly reflective material, according to the present invention, illustrated in operational relationship with stacked sheets of the material.

FIG. 2 is a diagrammatic view of the apparatus of FIG. 1 illustrating optics of the apparatus relative to the stacked sheets of material.

FIG. 3 is a top view of the apparatus of FIG. 1.

FIG. 4 is a side view of the apparatus of FIG. 1.

FIG. 5 is a block diagram of the apparatus of FIG. 1.

FIG. 6 is a graph of light intensity versus distance for the apparatus of FIG. 1.

DESCRIPTION OF THE PREFERRED EMBODIMENT(S)

Referring to the drawings and in particular FIG. 1, one embodiment of an apparatus 10 for counting planar flat sheets 12 of specularly reflective material, such as glass, is shown. The apparatus 10 is specifically designed for sensing and counting flat sheets 12 of glass which have been packed as for shipping such that the flat sheets 12 are stacked or tightly juxtaposed in side by side relationship with respect to one another. The flat sheets 12 of glass of the type on which the method and apparatus 10 of the present invention is employed are typically cut from larger sheets (not shown) resulting in planar sides 14 which are relatively smooth and are therefore specularly reflective. However, since the larger sheets are usually cut using a scriber, the cut side 14 of each flat sheet 12 also includes a terminal portion or edge 16 which is rough, relatively speaking, such that a portion of light, properly focused, is diffusely reflected.

Referring to FIGS. 1 through 5, the apparatus 10 includes a housing, generally indicated at 18, supported for movement along the sides 14 of a plurality of the flat sheets 12 of glass in a path approximately perpendicular to the sides 14 of the flat sheets 12. The apparatus 10 also includes a power supply 19 (FIG. 5) such as a battery. The apparatus 10 further includes a diode laser 20, to generate a parallel, collimated beam of light 22, mounted in the housing 18 and connected to the power supply 19. The beam of light 22 has a wavelength which is different from the wavelength of the visible ambient light.

As illustrated in FIG. 2, the beam of light 22 shines on the sides 14 of the flat sheets 12 such that the beam of light 22 is contained within a plane defined by each respective flat sheet 12 as it shines on the flat sheet 12. The beam of light 22 has a diameter which is less than half the thickness of the thinnest flat sheet 12 to be counted and shines on a finite point 24 on the sides 14 of the flat sheets 12 at a shallow, acute angle of incidence $\theta_i$ relative to the sides 14 of the flat sheets 12. The beam of light 22 is specularly reflected from the sides 14 of the flat sheets 12 at an angle of reflection $\theta_r$ substantially equal to the angle of incidence $\theta_i$ as the apparatus 10 is moved across the sides 14 of the flat sheets 12. This is true except at one terminal edge 16 of each side 14 of the flat sheets 12 where at least a portion of the beam of light 22 is diffusely reflected as shown at 23 in FIG. 2.

The apparatus 10 also includes a single sensor or photodetector 26 mounted in the housing 18 for receiving and sensing light diffusely reflected at a point 24 in a plane preferably defined by each of the flat sheets 12 from the terminal edge 16 of each side 14 of the flat sheets 12. The photodetector 26 includes a filter (not shown) corresponding to the wavelength of the beam of light 22 to filter light at other wavelengths. The photodetector 26 generates an output signal in response to the intensity of the diffusely reflected light. The apparatus 10 further includes a microprocessor 28 which forms an upper portion of a body 32 of the housing 18 to be described in FIGS. 3 and 4. The microprocessor 28 receives the output signal from the photodetector 26 and generates a numerical count of the flat sheets 12 over which the apparatus 10 has been moved. The numerical count corresponds to the light intensity sensed at the photodetector 26 when the light intensity exceeds a predetermined threshold value. As illustrated in FIG. 6, the intensity of the diffusely reflected light versus the distance along which the apparatus 10 has been moved is shown as spikes 29 corresponding to numbers 1 through 5 above the predetermined threshold value 29*a* where the intensity of the light increases dramatically as the beam of light 22 is shown on the terminal edge 16. The microprocessor 28 also includes a display 30 for displaying a digital readout of the numeric count of the flat sheets 12.

Referring now to FIGS. 3 and 4, the housing 18 includes the body 32, as mentioned above, and a plurality of wheels 34, 36, 38 adapted for rotation on corresponding shafts 40, 42, 44 and supporting the body 32 for rolling engagement with respect to the sides 14 of the flat sheets 12. At least one of the wheels 38 is operatively coupled to an encoder 46. The encoder 46 is used to determine the average thickness of the flat sheets 12. The housing 18 further includes a first channel 48 extending traversely in the housing 18 to the direction of movement of the housing 18 over the sides 14 of the flat sheets 12. The first channel 48 extends at a shallow, acute angle relative to the sides 14 of the flat sheets 12. The diode laser 20 is mounted in the first channel 48. The first channel 48 has an open end 50 and provides a path for the beam of light 22 from the diode laser 20 through the housing 18 onto the flat sheets 12.

The housing 18 further includes a second channel 52 extending vertically in the housing 18 and disposed at an acute angle relative to the first channel 48. The second channel 52 has an open end 54 disposed directly above the finite point 24 on which the beam of light 22 shines on the sides 14 of the flat sheets 12. The second channel 52 provides a path for light diffusely reflected from the terminal edge 16 on each side 14 of the flat sheets 12 to the photodetector 26 which is mounted in the second channel 52.

The housing 18 is substantially L-shaped having two legs 56, 58. The diode laser 20, photodetector 26, microprocessor 28 and encoder 46 are all disposed on one leg 56 of the housing 18. Preferably, a handle 60 extends substantially along the length of the other leg 58 for grasping by an operator to move the housing 18 along the sides 14 of the flat sheets 12 in a direction perpendicular to the planes defined by the flat sheets 12.

The present invention is also directed toward a method of counting the flat sheets 12 of the specularly reflective material such as glass which are juxtaposed in side by side relationship. The method includes the steps of moving a parallel collimated beam of light 22 having a wavelength different from the wavelength of the surrounding ambient light. The method also includes the steps of shining the beam of light 22 on a finite point 24 across the cut sides 14 of a plurality of the flat sheets 12 in a plane defined by the flat sheets 12 at a shallow, acute angle of incidence $\theta_i$ relative to the sides 14 of the flat sheets 12. The beam of light 22 is specularly reflected from the sides 14 of the flat sheets 12 at an angle of reflection $\theta_R$ substantially equal to the angle of incidence $\theta_i$ except at the terminal edge 16 of each cut side 14 where the beam of light 22 is diffusely reflected. The method also includes the steps of sensing the light diffusely reflected from the terminal edge 16 of each of the sides 14 of the flat sheets 12 and filtering the diffusely reflected light at the photodetector 26 corresponding to the wavelength of the beam of light 22 such that light at other wavelengths does not reach the photodetector 26.

The method further includes the steps of generating an output signal in response to the intensity of the diffusely reflected light and generating a numerical count of the flat sheets 12 over which the beam of light 22 has been moved corresponding to the light intensity sensed at the photodetector 26 when the light intensity exceeds the predetermined threshold value. The method further includes the steps of displaying a readout of the numerical count of the number of flat sheets 12 over which the beam of light 22 has been moved. Also, the method includes the steps of moving the beam of light 22 relative to the flat sheets 12 in a path perpendicular to the planes of the flat sheets 12 and shining the beam of light 22 on the cut side 14 of each of the flat sheets 12 such that the beam of light 22 is contained within the planes defined by each respective flat sheet 12 as it shines on the flat sheet 12. Finally, the method includes the steps of determining the average thickness of the flat sheets

12 as the beam of light 22 is moved across the flat sheets 12.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An apparatus for counting flat sheets of specularly reflective material juxtaposed in side by side relationship, said apparatus comprising:

a source of a collimated, beam of light adapted for movement to shine on a finite point across sides of a plurality of flat sheets such that the beam of light may be contained within the planes defined by each respective flat sheet, said beam of light disposed at a shallow, acute angle of incidence relative to the sides of the flat sheets such that the beam of light is specularly reflected from the sides of the flat sheets except at one terminal edge of each side of the flat sheets where the beam of light is diffusely reflected;

a sensor for sensing light diffusely reflected from the terminal edge of each of the flat sheets and generating an output signal in response to the intensity of the diffusely reflected light; and a microprocessor receiving the output signal from said sensor and generating a numerical count of the flat sheets over which the beam of light has been moved.

2. An apparatus as set forth in claim 1 including a housing supported for movement along the sides of the flat sheets.

3. An apparatus as set forth in claim 2 wherein said sensor is disposed in said housing to receive light diffusely reflected from the edges of the flat sheets in a plane defined by each of the flat sheets.

4. An apparatus as set forth in claim 3 wherein said housing includes a body and a plurality of wheels adapted for rolling engagement with respect to the sides of the flat sheets.

5. An apparatus as set forth in claim 4 including an encoder coupled to at least one of said wheels, said encoder determining an average thickness of the flat sheets.

6. An apparatus as set forth in claim 1 wherein said microprocessor includes a display for displaying a readout of the numeric count of the flat sheets.

7. An apparatus as set forth in claim 1 wherein said sensor comprises a photodetector having a filter corresponding to the wavelength of the beam of light to filter out light at other wavelengths.

8. An apparatus as set forth in claim 2 wherein said source of light comprises a laser, said housing including a first channel extending transversely in said housing to a direction of movement of said housing over the sides of the flat sheets and at a shallow acute angle relative to the sides of the flat sheets, said laser mounted in said first channel of said housing, said first channel having an open end and providing a path for light from said laser through said housing and onto the flat sheets.

9. An apparatus as set forth in claim 8 wherein said housing includes a second channel extending vertically in said housing and disposed at an acute angle relative to said first channel and having an open end disposed directly above the finite point on which the light shines on the sides of the flat sheets, said second channel providing a path for light diffusely reflected from the terminal portion of each side of the flat sheets to said sensor.

10. An apparatus as set forth in claim 9 wherein said housing is substantially L-shaped having two legs with said source, said sensor, and said microprocessor disposed on one leg and a handle extending substantially along the length of the other leg for grasping by an operator to move said housing along the sides of the flat sheets in a direction perpendicular to the planes defined by the flat sheets.

11. A method for counting flat sheets of specularly reflective material juxtaposed in side by side relationship, said method including the steps of:

moving a collimated, beam of light shining on a finite point across sides of a plurality of flat sheets such that the beam of light may be contained within the planes defined by each respective flat sheet, and such that said beam of light is disposed at a shallow, acute angle of incidence relative to the sides of the flat sheets such that the beam of light is specularly reflected from the sides of the flat sheets except at one terminal edge of each side of the flat sheets where the beam of light is diffusely reflected;

sensing light diffusely reflected from the terminal edge of each of the flat sheets and generating an output signal in response to the intensity of the diffusely reflected light; and generating a numerical count of the flat sheets over which the beam of light has been moved.

12. A method as set forth in claim 11 including the steps of moving the beam of light relative to the flat sheets in a path substantially perpendicular to the planes of the flat sheets and shining the beam of light on the side of each of the flat sheets.

13. A method as set forth in claim 12 including the steps of sensing light diffusely reflected from the sides of the flat sheets in a plane defined by each of the flat sheets.

14. A method as set forth in claim 13 including the steps of displaying a readout of the numerical count of the number of flat sheets over which the beam of light has been moved.

15. A method as set forth in claim 14 including the steps of determining an average thickness of the flat sheets as the beam of light is moved across the flat sheets.

16. A method as set forth in claim 15 including the steps of shining a beam of light having a wavelength different from a wavelength of surrounding visible ambient light.

17. A method as set forth in claim 16 including the steps of filtering the diffusely reflected light corresponding to the wavelength of the beam of light such that light at other wavelengths are not sensed.

* * * * *